US012663528B2

(12) United States Patent
Sun et al.

(10) Patent No.: US 12,663,528 B2
(45) Date of Patent: Jun. 23, 2026

(54) CUSTOMER TERMINAL DEVICE, POSITION DETECTION METHOD AND COMPUTER-READABLE STORAGE MEDIUM

(71) Applicant: ZTE CORPORATION, Shenzhen (CN)

(72) Inventors: Quan Sun, Shenzhen (CN); Yun'an Zhang, Shenzhen (CN); Rui Mao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 308 days.

(21) Appl. No.: 18/264,876

(22) PCT Filed: Jan. 27, 2022

(86) PCT No.: PCT/CN2022/074312
§ 371 (c)(1),
(2) Date: Aug. 9, 2023

(87) PCT Pub. No.: WO2022/188571
PCT Pub. Date: Sep. 15, 2022

(65) Prior Publication Data
US 2024/0111038 A1 Apr. 4, 2024

(30) Foreign Application Priority Data
Mar. 9, 2021 (CN) ......................... 202110255283.4

(51) Int. Cl.
*G01S 13/02* (2006.01)
*G01S 1/02* (2010.01)
(Continued)

(52) U.S. Cl.
CPC ............ *G01S 13/0209* (2013.01); *G01S 1/02* (2013.01); *G01S 5/0268* (2013.01); *G01S 13/878* (2013.01); *H04W 64/003* (2013.01)

(58) Field of Classification Search
CPC ....... H04W 64/00; H04W 64/003; G01S 1/02; G01S 5/0268; G01S 5/10; G01S 13/765; G01S 13/878
See application file for complete search history.

(56) References Cited

U.S. PATENT DOCUMENTS 10,698,074 B2 * 6/2020 Mutz ......................... G01S 5/10
2007/0217379 A1 * 9/2007 Fujiwara ............... H04W 64/00
370/338

(Continued)

FOREIGN PATENT DOCUMENTS

CN 107817494 A 3/2018
CN 108279702 A 7/2018

(Continued)

OTHER PUBLICATIONS

European Patent Office. Extended European Search Report for EP Application No. 22766098.2, mailed Jul. 5, 2024, pp. 1-11.

(Continued)

*Primary Examiner* — Vladimir Magloire
*Assistant Examiner* — Peter Davon Doze
(74) *Attorney, Agent, or Firm* — Vivacqua Crane, PLLC

(57) ABSTRACT

A customer terminal device, a position detection method and a computer-readable storage medium are disclosed. The c device may include an ultra-wideband (UWB) positioning module, which is configured to output a first detection signal; a first transmission component configured to receive the first detection signal and output a second detection signal according to the first detection signal; a second transmission component configured to receive the first detection signal (Continued)

and output a third detection signal according to first detection signal; an antenna module provided with a UWB positioning beacon configured to receive and send first, second and third detection signals to UWB positioning module; the UWB positioning module is further configured to receive first, second and third detection signals from UWB positioning beacon, and perform position detection on the antenna module.

14 Claims, 9 Drawing Sheets

(51) Int. Cl.

| | |
|---|---|
| *G01S 5/02* | (2010.01) |
| *G01S 13/87* | (2006.01) |
| *H04W 64/00* | (2009.01) |

(56) References Cited

U.S. PATENT DOCUMENTS

| | | | | |
|---|---|---|---|---|
| 2009/0047976 A1* | 2/2009 | Fujii | ................... | G01S 5/02216 |
| | | | | 455/456.1 |
| 2019/0129021 A1 | 5/2019 | Heyon | | |

| | | | | |
|---|---|---|---|---|
| 2020/0228943 A1* | 7/2020 | Martin | ............... | A63B 24/0062 |
| 2020/0272221 A1 | 8/2020 | Foster et al. | | |

FOREIGN PATENT DOCUMENTS

| | | | | | |
|---|---|---|---|---|---|
| CN | 110351655 A | * | 10/2019 | ........... | H04W 4/023 |
| CN | 111970672 A | | 11/2020 | | |
| CN | 112444818 A | | 3/2021 | | |
| CN | 112584488 A | * | 3/2021 | ......... | H04W 64/006 |
| EP | 4161111 A1 | | 4/2023 | | |
| WO | 2010124241 A2 | | 10/2010 | | |

OTHER PUBLICATIONS

Jeřábek, J., et al. "A Proposal of Radio Ultrawideband Systems for Precision Indoor Localization," 2015 25th International Conference Radioelektronika (Radioelektronika), Pardubice, Czech Republic, 2015, pp. 355-358.

Wymeersch, H., et al. "Cooperative Localization in Wireless Networks," Proceedings of the IEEE, vol. 97, No. 2, Feb. 2009, pp. 427-450.

International Searching Authority. International Search Report and Written Opinion for PCT Application No. PCT/CN2022/074312 and English translation, mailed Mar. 8, 2022, pp. 1-10.

\* cited by examiner

First
Transmission
Component

Mother Board

Second
Transmission
Component

UWB Positioning
Module

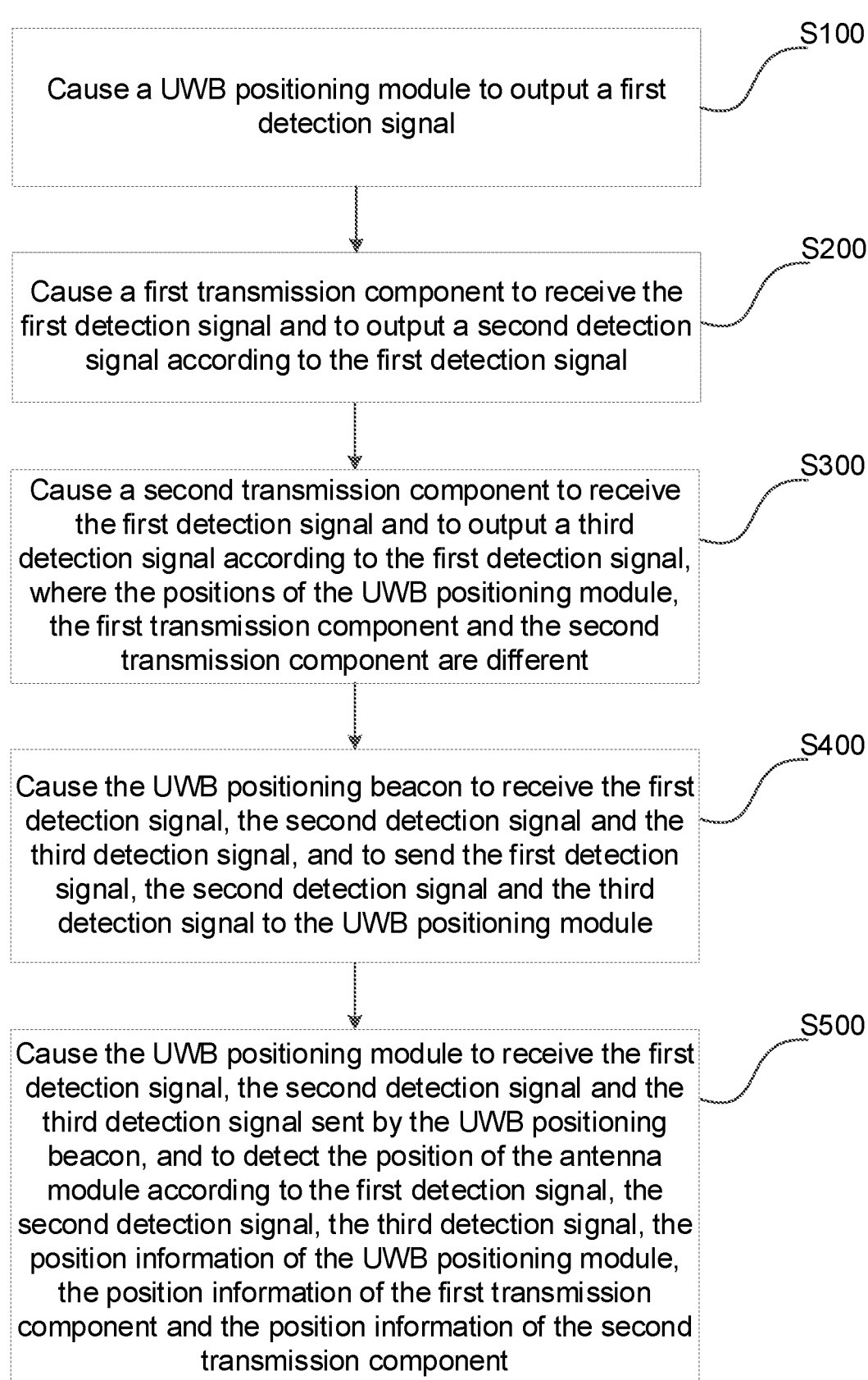

Cause a UWB positioning module to output a first detection signal

S100

Cause a first transmission component to receive the first detection signal and to output a second detection signal according to the first detection signal

S200

Cause a second transmission component to receive the first detection signal and to output a third detection signal according to the first detection signal, where the positions of the UWB positioning module, the first transmission component and the second transmission component are different

S300

Cause the UWB positioning beacon to receive the first detection signal, the second detection signal and the third detection signal, and to send the first detection signal, the second detection signal and the third detection signal to the UWB positioning module

S400

Cause the UWB positioning module to receive the first detection signal, the second detection signal and the third detection signal sent by the UWB positioning beacon, and to detect the position of the antenna module according to the first detection signal, the second detection signal, the third detection signal, the position information of the UWB positioning module, the position information of the first transmission component and the position information of the second transmission component

Figure 7:
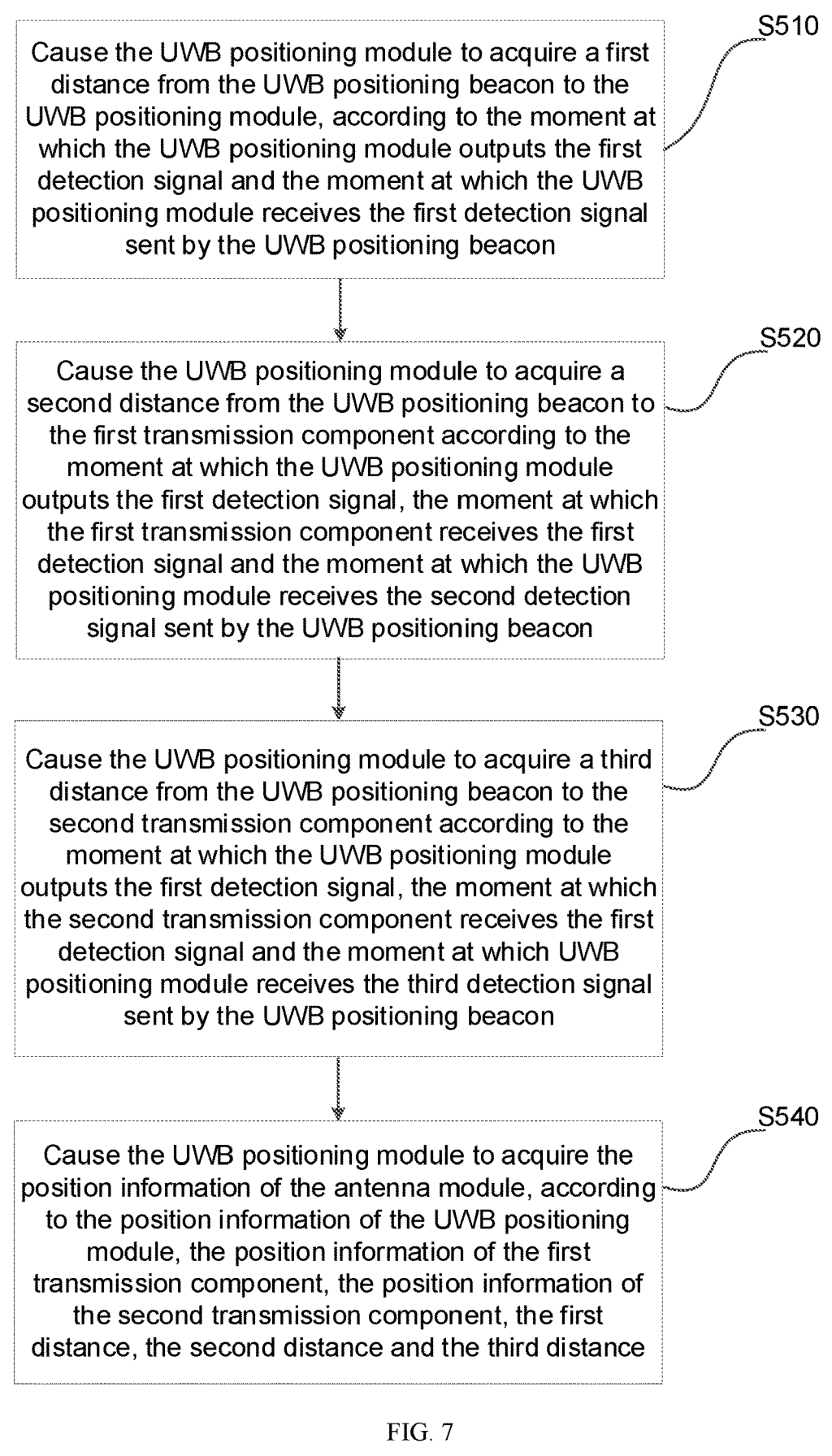

Cause the UWB positioning module to acquire a first distance from the UWB positioning beacon to the UWB positioning module, according to the moment at which the UWB positioning module outputs the first detection signal and the moment at which the UWB positioning module receives the first detection signal sent by the UWB positioning beacon

S510

Cause the UWB positioning module to acquire a second distance from the UWB positioning beacon to the first transmission component according to the moment at which the UWB positioning module outputs the first detection signal, the moment at which the first transmission component receives the first detection signal and the moment at which the UWB positioning module receives the second detection signal sent by the UWB positioning beacon

S520

Cause the UWB positioning module to acquire a third distance from the UWB positioning beacon to the second transmission component according to the moment at which the UWB positioning module outputs the first detection signal, the moment at which the second transmission component receives the first detection signal and the moment at which UWB positioning module receives the third detection signal sent by the UWB positioning beacon

S530

Cause the UWB positioning module to acquire the position information of the antenna module, according to the position information of the UWB positioning module, the position information of the first transmission component, the position information of the second transmission component, the first distance, the second distance and the third distance

Figures 8, 9, 10:
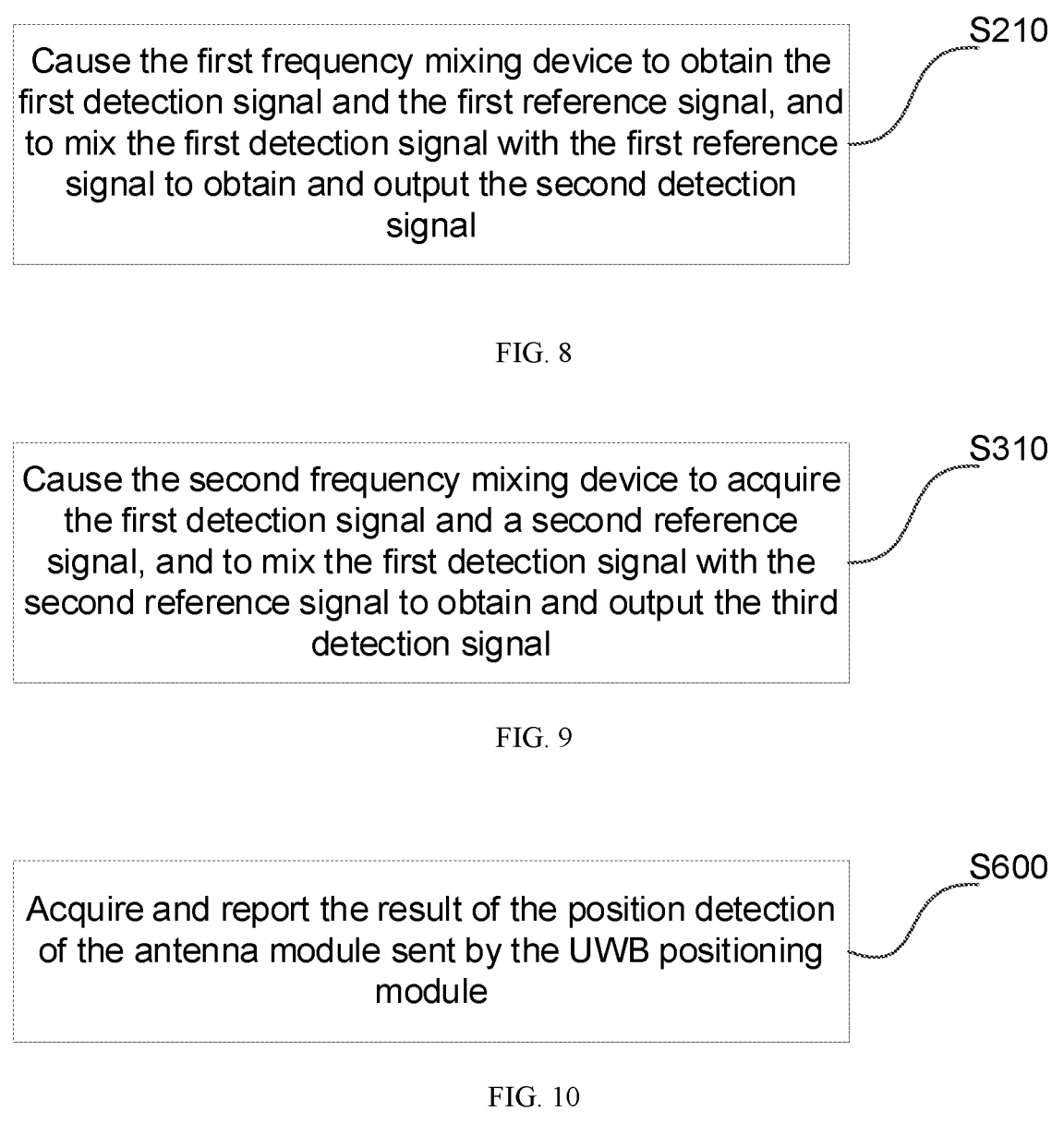

Cause the first frequency mixing device to obtain the first detection signal and the first reference signal, and to mix the first detection signal with the first reference signal to obtain and output the second detection signal

Cause the second frequency mixing device to acquire the first detection signal and a second reference signal, and to mix the first detection signal with the second reference signal to obtain and output the third detection signal

Acquire and report the result of the position detection of the antenna module sent by the UWB positioning module

CUSTOMER TERMINAL DEVICE, POSITION DETECTION METHOD AND COMPUTER-READABLE STORAGE MEDIUM

CROSS-REFERENCE TO RELATED APPLICATION

This application is a national stage filing under 35 U.S.C. § 371 of international application number PCT/CN2022/074312, filed Jan. 27, 2022, which claims priority to Chinese patent application No. 202110255283.4, filed Mar. 9, 2021. The contents of these applications are incorporated herein by reference in their entirety.

TECHNICAL FIELD

The present disclosure relates to but is not limited to the technical field of communication, in particular to a customer terminal device, a method for position detection and a computer-readable storage medium.

BACKGROUND

In practical application, the antenna in a Customer Premise Equipment (CPE) is usually for transfer of data transmission. For example, the antenna in the CPE can be configured to receive and transmit the data signal sent by a cell of a base station. During the receiving of the data signal, the position of the antenna in the CPE will affect the signal transmission between the CPE and the cell of the base station. Therefore, in order to ensure the quality of the data signal received by the CPE, it is necessary to check the position information of the antenna in the CPE. Multiple external positioning devices are being deployed to detect the antennas in the CPE simultaneously in the related technical solutions. The overall arrangement in a limited space is relatively more complex and the cost is higher, due to the need for configuring multiple positioning devices at the same time.

SUMMARY

The following is a summary of the subject matter described herein. This summary is not intended to limit the scope of protection of the claims.

Provided are a customer terminal device, a method for position detection, and a computer-readable storage medium in some embodiments of the present disclosure.

According to an embodiment of the present disclosure, there is provided a customer terminal device, which may include, an ultra-wideband (UWB) positioning module, which is configured to output a first detection signal; a first transmission component, which is configured to receive the first detection signal and output a second detection signal according to the first detection signal; a second transmission component, which is configured to receive the first detection signal and output a third detection signal according to the first detection signal; where, the UWB positioning module, the first transmission component and the second transmission component are positioned at different positions; an antenna module, which is provided with a UWB positioning beacon that is configured to receive the first detection signal, the second detection signal and the third detection signal, and to send the first detection signal, the second detection signal and the third detection signal to the UWB positioning module; and where, the UWB positioning module is further configured to receive the first detection signal, the second detection signal and the third detection signal sent by the UWB positioning beacon, and to perform position detection on the antenna module according to the first detection signal, the second detection signal, the third detection signal, the position information of the UWB positioning module, the position information of the first transmission component, and the position information of the second transmission component.

According to another embodiment of the present disclosure, there is provided a method for position detection, which is applied to a customer terminal device including an ultra-wideband (UWB) positioning module, a first transmission component, a second transmission component, and an antenna module provided with a UWB positioning beacon, where the UWB positioning module, the first transmission component and the second transmission component are positioned in different positions; and where, the method may include, causing the UWB positioning module to output a first detection signal; causing the first transmission component to receive the first detection signal and output a second detection signal according to the first detection signal; causing the second transmission component to receive the first detection signal and output a third detection signal according to the first detection signal; causing the UWB positioning beacon to receive the first detection signal, the second detection signal and the third detection signal, and to send the first detection signal, the second detection signal and the third detection signal to the UWB positioning module; and causing the UWB positioning module to receive the first detection signal, the second detection signal and the third detection signal sent by the UWB positioning beacon, and to perform position detection on the antenna module according to the first detection signal, the second detection signal, the third detection signal, the position information of the UWB positioning module, the position information of the first transmission component and the position information of the second transmission component.

According to yet another embodiment of the present disclosure, there is provided a customer terminal device, which may include a memory, a processor, and a computer program stored in the memory and executable on the processor which, when executed by the processor, causes the processor to carry out the method for position detection as described above.

According to yet another embodiment of the present disclosure, there is further provided a computer-readable storage medium storing a computer-executable instruction which, when executed by a processor causes the processor to carry out the method for position detection as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims and drawings.

BRIEF DESCRIPTION OF DRAWINGS

The drawings are intended to provide a further understanding of the technical scheme of the present disclosure, and constitute a part of the specification, and they are intended to illustrate the technical scheme of the present disclosure in conjunction with the embodiments of the present disclosure, but are not intended to limit the technical scheme of the present disclosure.

FIG. 6 depicts a flowchart showing a method for position detection according to an embodiment of the present disclosure;

FIG. 7 depicts a flowchart showing the performing of position detection on an antenna module in a method for position detection according to an embodiment of the present disclosure;

FIG. 8 depicts a flowchart showing the output of a second detection signal in a method for position detection according to an embodiment of the present disclosure;

FIG. 9 depicts a flowchart showing the output of a third detection signal in a method for position detection according to an embodiment of the present disclosure;

FIG. 10 depicts a flowchart showing a method for position detection according to another embodiment of the present disclosure;

DETAILED DESCRIPTION

The purpose, technical scheme and advantages of the present disclosure will become apparent through the following description for various embodiments in conjunction with the drawings. It should be understood that the embodiments described here are intended for illustration but not limitation to the present disclosure.

It should be noted that although the devices are shown with individual functional modules in the schematic diagram and the logical sequences are shown in the flow chart, in some cases, the devices can have different modules than those shown and the steps can be executed in a different order than those shown. It should be noted that the terms "first" and "second", if used in the description, the claims and the drawings are intended to distinguish similar objects, and do not necessarily imply any specific order or sequence.

Provided are a customer terminal device, a method for position detection, and a computer-readable storage medium in some embodiments of the present disclosure. Given that the UWB positioning module, the first and second transmission components are in positioned different positions, the UWB positioning module is enabled to detect the position of the antenna module according to the first detection signal, the second detection signal, the third detection signal, the position information of the UWB positioning module, the position information of the first transmission component and the position information of the second transmission component. Since the position detection of the antenna module can be realized by means of one UWB positioning module and two transmission components for signal transfer, there is no need to simultaneously set up multiple positioning devices to detect the position of the antenna module. Thereby, the position detection of the antenna module can be carried out with reduced complexity in spatial arrangement and costs.

Some embodiments of the present disclosure will be further illustrated with reference to the drawings.

Figure 1:
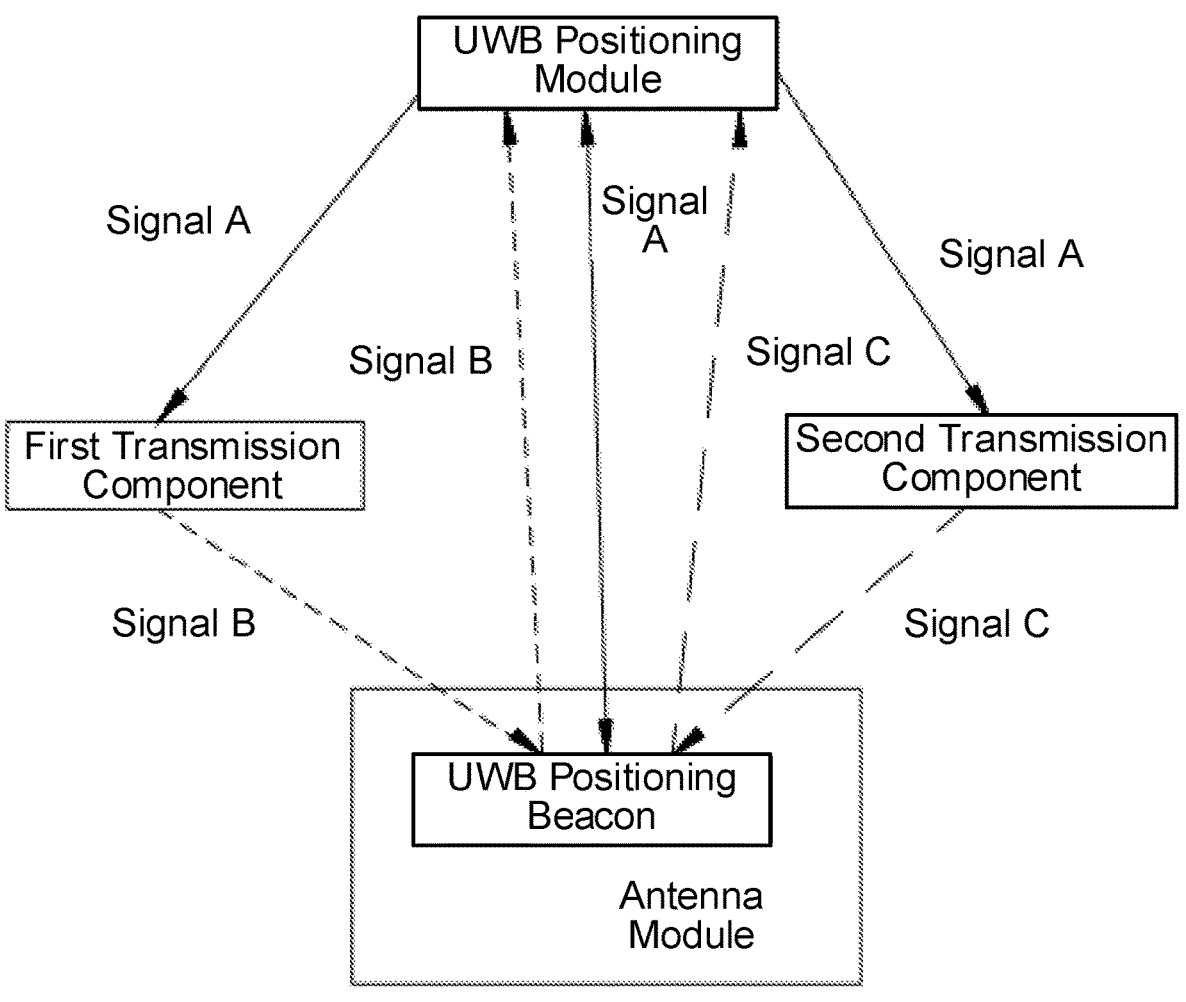
FIG. 1 depicts a schematic diagram showing a customer terminal device according to an embodiment of the present disclosure.

FIG. 1 depicts a schematic diagram showing a customer terminal device according to an embodiment of the present disclosure. Each connection line and arrow in FIG. 1 are indicative of the transmission direction of each detection signal, and different detection signals are represented by different types of lines, with signal A representing the first detection signal, signal B representing the second detection signal and signal C representing the third detection signal.

In the embodiment shown in FIG. 1, the customer terminal device set forth in an embodiment of the present disclosure includes, but is not limited to the following components.

An ultra-wideband (UWB) positioning module, which is configured to output a first detection signal.

A first transmission component, which is configured to receive the first detection signal and output a second detection signal according to the first detection signal.

A second transmission component, which is configured to receive the first detection signal and output a third detection signal according to the first detection signal. The UWB positioning module, the first transmission component and the second transmission component are distributed at different positions.

An antenna module, which is provided with a UWB positioning beacon that is configured to receive the first detection signal, the second detection signal and the third detection signal, and to send the first detection signal, the second detection signal and the third detection signal to the UWB positioning module.

The UWB positioning module is also configured to receive the first detection signal, the second detection signal and the third detection signal sent by the UWB positioning beacon, and to perform position detection on the antenna module according to the first detection signal, the second detection signal, the third detection signal, the position information of the UWB positioning module, the position information of the first and second transmission components.

In an embodiment, the UWB technique is a wireless communication technique. The generation of UWB signals can be realized by modulating narrow pulses (e.g., quadratic Gaussian pulses) with extremely short transmission time (e.g., 2 ns or below) to UWB operating frequency band based on up-conversion methods such as differentiation or mixing. The first detection signal output by the UWB positioning module may include but is not limited to UWB signals. Correspondingly, the second detection signal and the third detection signal generated by the first and second transmission components based on the first detection signal may also include but are not limited to UWB signals. As UWB signals belong to one of the communication signals, that is, UWB signals have general characteristics of communication signals, the generation and transmission of UWB signals will not be described in detail in order to avoid redundancy.

In an embodiment, the UWB positioning beacon can be, but is not limited to, various types of integrated devices. The UWB positioning beacon can achieve labeling of antenna modules and stable reception and output of various detection signals through an integrated internal system architecture with positioning functions, thereby assisting in position detection of antenna modules. It can be understood that since the position information of UWB positioning modules, the position information of the first transmission component and the position information of the second transmission component have been known and all position information is different, the UWB positioning beacon can send each detection signal to the UWB positioning module based on the above position information, so that the UWB positioning module can perform position detection on the antenna module.

In an embodiment, given that the UWB positioning module, the first and second transmission components are in positioned different positions, the UWB positioning module can detect the position of the antenna module according to the first detection signal, the second detection signal, the third detection signal, the position information of the UWB positioning module, the position information of the first transmission component and the position information of the second transmission component. Since the position detection of the antenna module can be realized by means of one UWB positioning module and two transmission components for signal transfer, there is no need to simultaneously set up multiple positioning devices to detect the position of the antenna module. Thereby, the position detection of the antenna module can be carried out with reduced complexity in spatial arrangement and costs.

It can be understood that, since the UWB positioning module, the first transmission component and the second transmission component are positioned in different positions, the output and reception of the first detection signal, the second detection signal and the third detection signal corresponding to the corresponding components can be in a stable state. And the situation that each detection signal interferes with one another is avoided, thus ensuring the accuracy of position detection of the antenna module.

In an embodiment, the first transmission component includes, but is not limited to, a first frequency mixing device that is configured to acquire a first detection signal and a first reference signal, and to mix the first detection signal with the first reference signal to obtain and output a second detection signal.

In an embodiment, frequency mixing refers to the process in which two electrical signals of different frequencies are mixed with nonlinear elements (e.g., diodes or devices having similar functions) and an electrical signal with a third frequency is generated through a frequency selection loop. That is, a first detection signal is mixed with a first reference signal to generate a second detection signal. The positioning device in the related technical scheme is replaced by the first frequency mixing device. Since the first reference signal can be preset, the high accuracy of the obtained second detection signal is ensured. That is, the first frequency mixing device can also output stable and reliable signals of a frequency band for position detection. It is apparent that, the first frequency mixing device, as a nonlinear element, has lower requirements in arrangement and cost, which is beneficial to realize the position detection of the antenna in the customer terminal device with reduced spatial arrangement complexity and cost.

It can be understood that the first reference signal can be generated in any form and acquired by the first transmission component. The frequency of the first reference signal can be fixed, so as to realize stable and controllable frequency mixing operation. For example, the first reference signal can be a local oscillator signal, but this embodiment is not limited thereto. Moreover, the second detection signal can be amplified compared with the first detection signal, so as to facilitate the spatial transmission of the second detection signal, thereby reducing the detection error.

In an embodiment, the second transmission component includes, but is not limited to, a second frequency mixing device that is configured to acquire a first detection signal and a second reference signal, and mix the first detection signal with the second reference signal to obtain and output a third detection signal.

In an embodiment, the first detection signal is mixed with the second reference signal to generate a third detection signal. The positioning device in the related technical scheme is replaced by the second frequency mixing device. Since the second reference signal can be preset, the high accuracy of the obtained third detection signal is ensured. That is, the second frequency mixing device can also output stable and reliable signals of a frequency band for position detection. It is apparent that, the second frequency mixing device, as a nonlinear element, has lower requirements in arrangement and cost, which is beneficial to realize the position detection of the antenna in the customer terminal device with reduced spatial arrangement complexity and cost.

It can be understood that the second reference signal can be generated in any form and acquired by the second transmission component. The frequency of the second reference signal can be fixed, so as to realize stable and controllable frequency mixing operation. For example, the second reference signal can be a local oscillator signal, but this embodiment is not limited thereto. Moreover, the third detection signal can be amplified compared with the first detection signal, so as to facilitate the spatial transmission of the third detection signal, thereby reducing the detection error.

Figure 2:
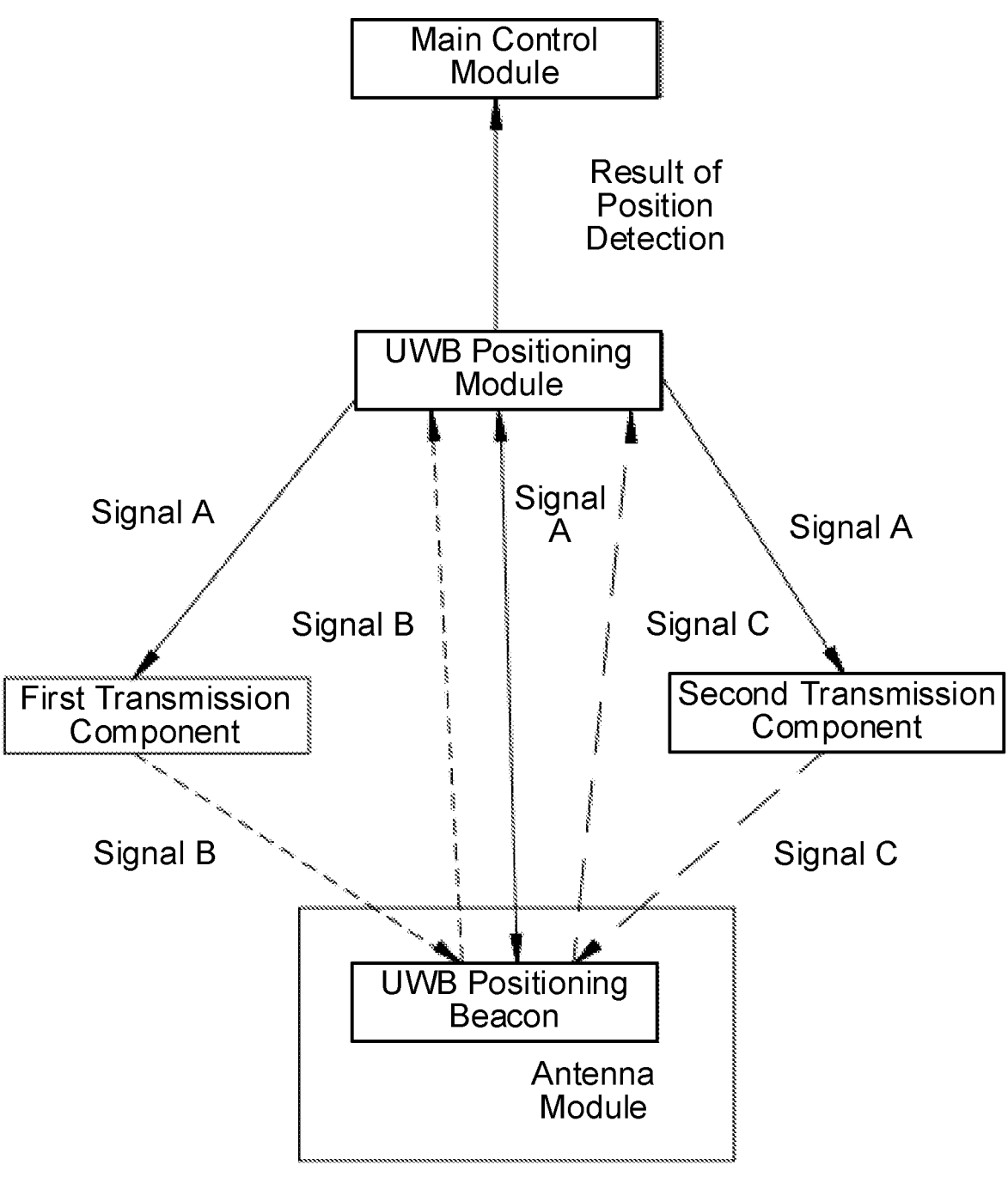
FIG. 2 depicts a schematic diagram showing a customer terminal device according to another embodiment of the present disclosure.

Referring to FIG. 2, in an embodiment, the customer terminal device further includes a main control module that is configured to obtain and report a result of the position detection of the antenna module sent by the UWB positioning module.

In an embodiment, the UWB positioning module detects the position of the antenna module, that is, the UWB positioning module can determine the result of the position detection of the antenna module. And thus, the main control module can obtain and report the result of the position detection. So that the equipment, devices or users at the subsequent stage can perform analysis based on the result of the position detection in which a determination is performed as to whether the position of the antenna module will affect the signal transmission between the customer terminal device and the cell of a base station, so as to further determine whether the adjustment in position of the antenna module is necessary to ensure the stable transmission of signals between customer terminal devices and the cell of the base station.

Moreover, when acquiring the result of the position detection of the antenna module sent by the UWB positioning module, the main control module will perform an analysis before alarm on the result of the position detection, in which the difference between the result of the position detection and the preset alarm condition is determined. In response to the result of the position detection meeting a preset alarm condition, the main control module reports the result of the position detection and sends an alarm message at the same time, thus intuitively and reliably alarming that the current position of the antenna module may affect the signal transmission between the customer terminal device and the cell of the base station.

It can be understood that the preset alarm condition can be determined according to the history reference position, angle and orientation of the antenna device, and this embodiment is not limited thereto. The forms of the alarm message can be but are not limited to, sound alarm, light alarm or text alarm and prompt, and this embodiment is not limited thereto.

Some example embodiments are illustrated below for better understanding of the operating principles of the above-described embodiments.

Example Embodiment One

Figure 3:
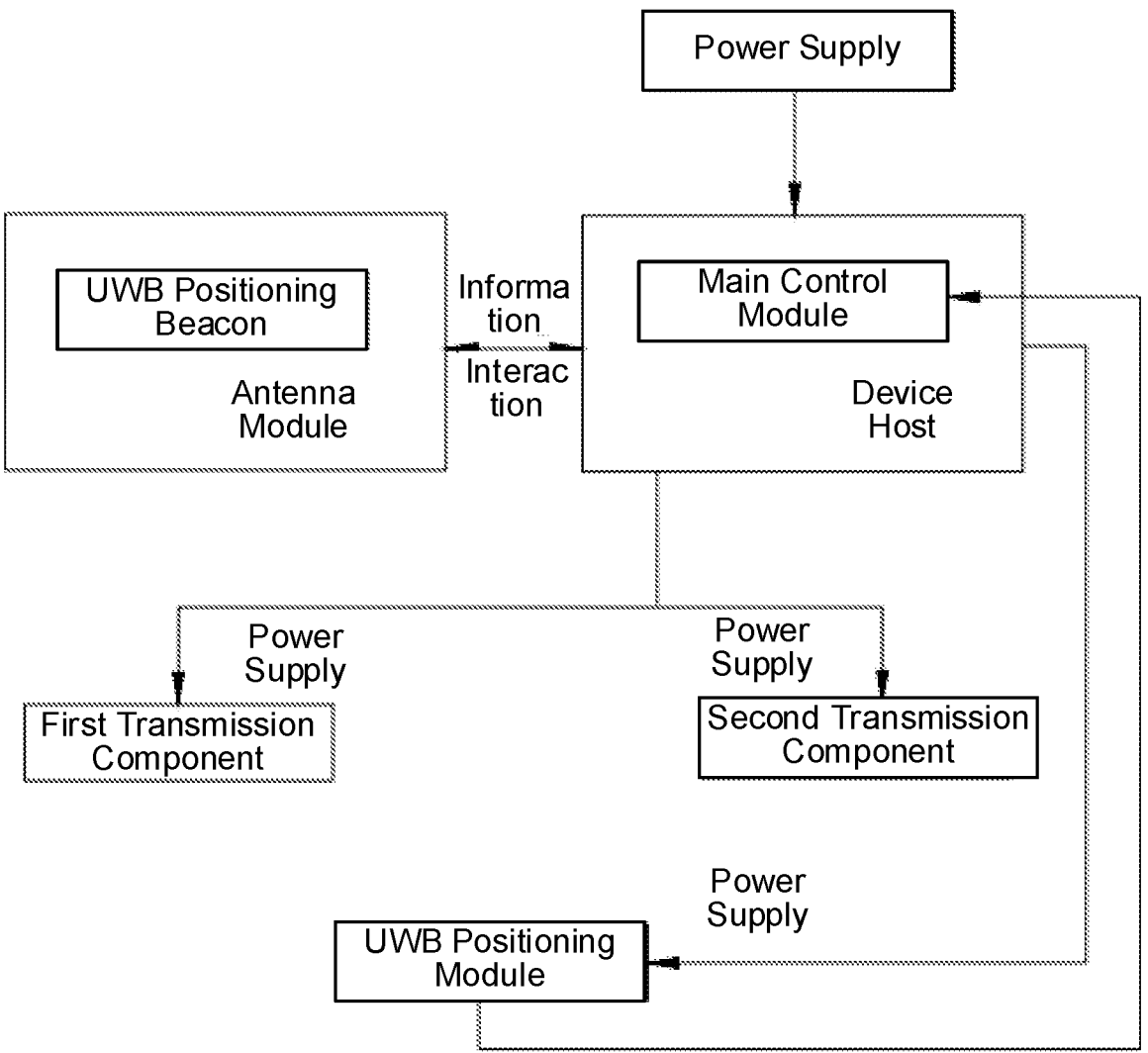
FIG. 3 depicts a schematic diagram showing a customer terminal device according to another embodiment of the present disclosure.

FIG. 3 depicts a schematic diagram showing a customer terminal device according to another embodiment of the present disclosure.

FIG. 3 shows the hardware architecture of a customer terminal device according to an embodiment. In addition to the antenna module, the UWB positioning beacon, the UWB positioning module, the first and second transmission components, the customer terminal device further includes a device host and a power supply connected to the device host. Data can be communicated between the device host and the antenna module. The device host serves as a controller. The startup or shutdown of the corresponding components can be controlled according to whether the power supply is provided for them. For example, when the device host is powered on which only supplies power to the UWB positioning module and the first transmission component, the UWB positioning module and the first transmission component can be started, while the second transmission component and the UWB positioning beacon are kept off. It should be noted that other power supplies can be provided or the power supply can directly supply power to each component, in addition to the power supply by the device host, and this embodiment is not limited thereto.

Figure 4:
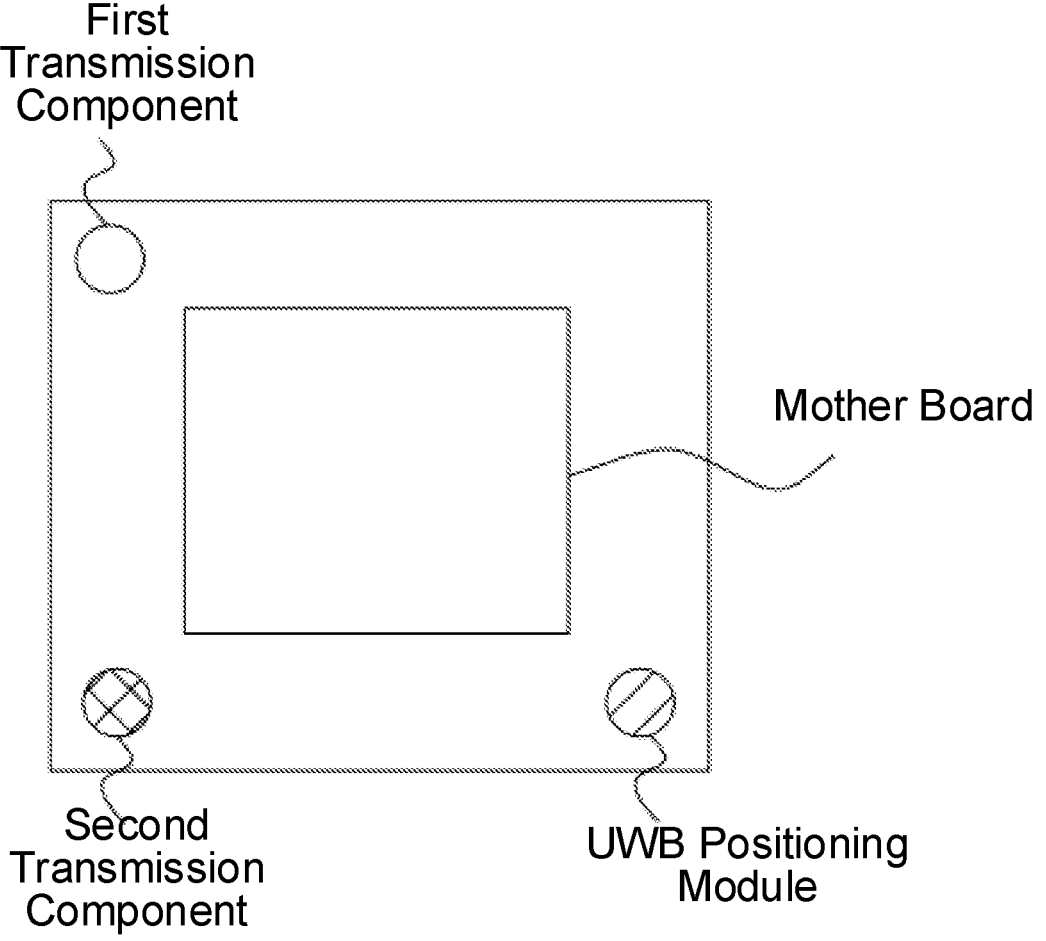
FIG. 4 depicts a schematic diagram showing a device host in a customer terminal device according to an embodiment of the present disclosure.

In this hardware architecture, each of the UWB positioning module, the first transmission component and the second transmission component can be arranged in the device host. FIG. 4 shows a schematic diagram of the device host according to an embodiment. The motherboard is arranged in the middle of the device host. The UWB positioning module, the first transmission component and the second transmission component are respectively arranged at different corners of the device host. It is apparent to those having ordinary skills in the art that those components can be also arranged in the device host according to the practical situation. For example, the UWB positioning module can be arranged externally to the device host, and this embodiment is not limited thereto.

The device host can be provided therein with a main control module. And the result of position detection of the antenna by the UWB positioning module can be transmitted to the main control module within the device host through a wired or wireless interface. That is, the device host can obtain and upload the result of the position detection of the antenna in real-time, which has the function of overall control.

Example Embodiment Two

Figure 5:
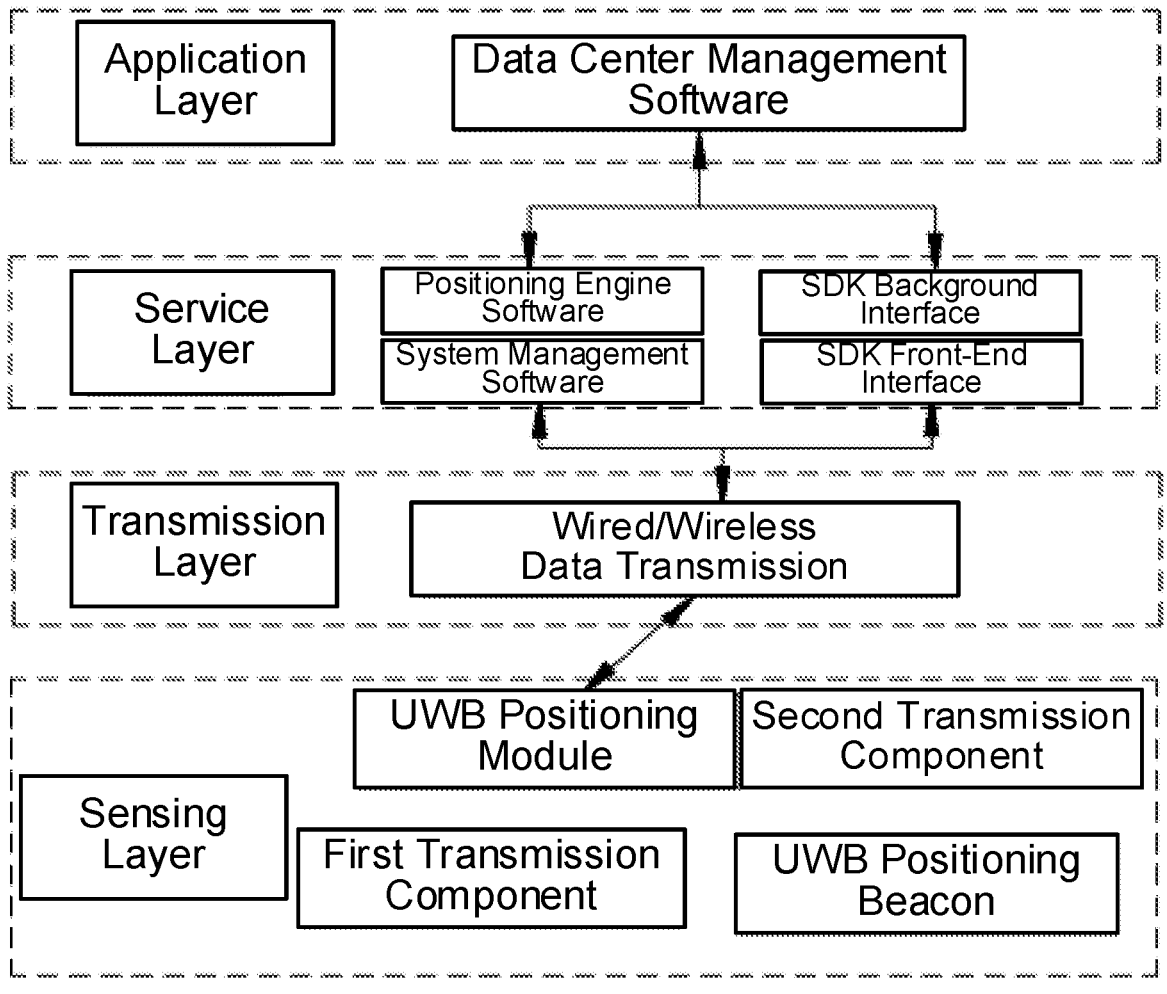
FIG. 5 depicts a schematic diagram showing a customer terminal device according to another embodiment of the present disclosure.

FIG. 5 depicts a schematic diagram showing a customer terminal device according to another embodiment of the present disclosure.

FIG. 5 shows the software architecture of a customer terminal device according to an embodiment, which includes but is not limited to an application layer, a service layer, a transmission layer and a sensing layer.

In particular, the application layer is provided with data center management software adapted to the data center. When the device host sends the result of the position detection of the antenna to the data center, the data center extracts the position information of the antenna according to the result of the position detection and compares the position information in real-time. The object compared with the position information of the antenna at the current moment can be the position information of the antenna at a previous moment. Once the data center finds that the position information of the antenna has changed according to the comparison, it can be determined that the angle or orientation of the antenna device has shifted, so it is necessary adjust the antenna device. Alternatively, the device host uploads the result of the position detection along with the alarm message, it is indicated that the position of the antenna may have shifted, in this case, the data center can directly adjust the antenna device without the comparison.

It can be understood that, the definition of the previous moment and the subsequent moment can be applied according to the specific situation. For example, if the customer terminal device is powered off, the previous moment can represent the operating moment before the power of the customer terminal device is off, and the subsequent moment can represent the operating moment when the customer terminal device is restarted after the power off. By comparison of the differences between the above two moments, it can be known whether the antenna module has shifted during the power-off and restart process of the customer terminal device.

It can be understood that, the method for the comparison can also be customized according to the practical situation. For example, the comparison can be performed directly according to whether the position information of the antennas at two moments is the same, or with a preset position change threshold according to the difference between the position information of the antennas at two moments, and this embodiment is not limited thereto.

The service layer is provided with positioning engine software, system management software, Software Development Kit (SDK) background interface and SDK front-end interface, etc. The result of the position detection of the antenna module is uploaded to the application layer through positioning engine software and SDK background interface, and is imported from the transmission layer through system management software and SDK front-end interface.

The transmission layer is intended to realize the wired or wireless transmission of the result of the position detection of the antenna module.

The sensing layer is provided with a UWB positioning module, a first transmission component, a second transmission component and a UWB positioning beacon, for detection of the position of the antenna module. Since the functions and operating principles of each component have been illustrated in the above embodiments, they are not repeated here to avoid redundancy.

Moreover, the UWB positioning module is configured to:
acquire a first distance from the UWB positioning beacon to the UWB positioning module, according to the moment at which the UWB positioning module outputs the first detection signal and the moment at which the UWB positioning module receives the first detection signal sent by the UWB positioning beacon;

acquire a second distance from the UWB positioning beacon to the first transmission component according to the moment at which the UWB positioning module outputs the first detection signal, the moment at which the first transmission component receives the first detection signal and the moment at which the UWB positioning module receives the second detection signal sent by the UWB positioning beacon;

acquire a third distance from the UWB positioning beacon to the second transmission component according to the moment at which the UWB positioning module outputs the first detection signal, the moment at which the second transmission component receives the first detection signal and the moment at which UWB positioning module receives the third detection signal sent by the UWB positioning beacon; and acquire the position information of the antenna module, according to the position information of the UWB positioning module, the position information of the first transmission component, the position information of the second transmission component, the first distance, the second distance and the third distance.

In an embodiment, since each detection signal is an electrical signal, that is, the propagation speed of each detection signal is fixed (theoretically, it is the speed of light, which can actually be measured according to different conditions), after the moment at which each detection signal is output or received is obtained, the propagation distance of the corresponding detection signal can be determined by the product of the corresponding actual time and the propagation speed, i.e., the determined corresponding distance between each component: the first distance, the second distance and the third distance described above. And since the position information of each component is determined, after determining the corresponding distance between each component, the position detection of the antenna module can be realized with the position information of each component, so as to obtain the position information of the antenna module.

It can be understood that, the moment at which the first detection signal is output by the UWB positioning module, is theoretically no earlier than the moment at which a certain detection signal sent by the UWB positioning beacon (i.e., one of the first detection signal, the second detection signal and the third detection signal sent by the UWB positioning beacon) finally received by the UWB positioning module. Thereby, it is ensured that the signal output by the UWB positioning module and the signal returned by the UWB positioning beacon is reliable and completed, and the errors are limited to pose an adverse impact on the measurement of each detection distance.

Some example embodiments are illustrated below for better understanding of the operating principles of the above-described embodiments.

Example Embodiment Three

The following definitions are made at first, based on the embodiment shown in FIG. 1, for the convenience of illustration.

The total time between the moment at which the UWB positioning module outputs the first detection signal and the moment at which the UWB positioning module receives the first detection signal sent by the UWB positioning beacon is denoted as Ta. It is apparent that, the time of the flight of the signal from the UWB positioning module to the UWB positioning beacon, and the time of the flight of the signal from the UWB positioning beacon to the UWB positioning module, are both Ta/2.

The moment at which the first transmission component receives the first detection signal is denoted as T1. The moment at which the UWB positioning module receives the second detection signal sent by the UWB positioning beacon is denoted as Tb.

The moment at which the second transmission component receives the first detection signal is denoted as T2. The moment at which the UWB positioning module receives the third detection signal sent by the UWB positioning beacon is denoted as Tc.

The first distance, the second distance and the third distance are denoted as La, Lb and Lc respectively;

Assume that all detection signals are electromagnetic waves under stable conditions, and the propagation speed is c.

Then, based on the above data, the following calculation results can be obtained:

$$La = (c*Ta)/2;$$

$$Lb = c*(Tb - Ta/2 - T1);$$

$$Lc = c*(Tc - Ta/2 - T1).$$

It can be seen that the position information of the antenna module can be obtained through the fixed position information of the UWB positioning module, and of the first and second transmission components, and La, Lb and Lc.

Some embodiments of the method for position detection are provided in the present disclosure, based on the structures of the customer terminal devices provided in the above embodiments.

FIG. 6 depicts a flowchart showing a method for location detection according to an embodiment of the present disclosure, which is applicable to the customer terminal device in the embodiment shown in any one of FIGS. 1 to 3 or FIG. 5. The method includes but is not limited to operations S100 to S500.

At S100, a UWB positioning module is caused to output a first detection signal.

At S200, a first transmission component is caused to receive the first detection signal and to output a second detection signal according to the first detection signal.

At S300, a second transmission component is caused to receive the first detection signal and to output a third detection signal according to the first detection signal, where the positions of the UWB positioning module, the first transmission component and the second transmission component are different.

At S400, the UWB positioning beacon is caused to receive the first detection signal, the second detection signal and the third detection signal, and to send the first detection signal, the second detection signal and the third detection signal to the UWB positioning module.

At S500, the UWB positioning module is caused to receive the first detection signal, the second detection signal and the third detection signal sent by the UWB positioning beacon, and to detect the position of the antenna module according to the first detection signal, the second detection signal, the third detection signal, the position information of the UWB positioning module, the position information of the first transmission component and the position information of the second transmission component.

In an embodiment, given that the UWB positioning module, the first and second transmission components are in positioned different positions, the UWB positioning module is caused to detect the position of the antenna module according to the first detection signal, the second detection signal, the third detection signal, the position information of the UWB positioning module, the position information of the first transmission component and the position information of the second transmission component. Since the position detection of the antenna module can be realized by means of one UWB positioning module and two transmission components for signal transfer, there is no need to simultaneously set up multiple positioning devices to detect the position of the antenna module. Thereby, the position detection of the antenna module can be carried out with reduced complexity in spatial arrangement and costs.

As shown in FIG. 7, S500 includes but is not limited to S510 to S540.

At S510, the UWB positioning module is caused to acquire a first distance from the UWB positioning beacon to the UWB positioning module, according to the moment at which the UWB positioning module outputs the first detection signal and the moment at which the UWB positioning module receives the first detection signal sent by the UWB positioning beacon.

At S520, the UWB positioning module is caused to acquire a second distance from the UWB positioning beacon to the first transmission component according to the moment at which the UWB positioning module outputs the first detection signal, the moment at which the first transmission component receives the first detection signal and the moment at which the UWB positioning module receives the second detection signal sent by the UWB positioning beacon.

At S530, the UWB positioning module is caused to acquire a third distance from the UWB positioning beacon to the second transmission component according to the moment at which the UWB positioning module outputs the first detection signal, the moment at which the second transmission component receives the first detection signal and the moment at which UWB positioning module receives the third detection signal sent by the UWB positioning beacon.

At S540, the UWB positioning module is caused to acquire the position information of the antenna module, according to the position information of the UWB positioning module, the position information of the first transmission component, the position information of the second transmission component, the first distance, the second distance and the third distance.

In an embodiment, since each detection signal is an electrical signal, that is, the propagation speed of each detection signal is determined, after the UWB positioning module is caused to acquire the moment at which each detection signal is output or received, the propagation distance of the corresponding detection signal can be determined by the product of the corresponding actual time and the propagation speed, i.e., the determined corresponding distance between each component: the first distance, the second distance and the third distance described above. And since the position information of each component is determined, after the UWB positioning module determines the corresponding distance between each component, the position detection of the antenna module can be realized with the position information of each component, so as to obtain the position information of the antenna module.

As shown in FIG. 8, S200 includes but is not limited to S210 in the case that the first transmission component includes but is not limited to a first frequency mixing device.

At S210, the first frequency mixing device is caused to obtain the first detection signal and the first reference signal, and to mix the first detection signal with the first reference signal to obtain and output the second detection signal.

In an embodiment, the positioning device in the related technical scheme is replaced by the first frequency mixing device. Since the first reference signal can be preset, the high accuracy of the obtained second detection signal is ensured. That is, the first frequency mixing device can also output stable and reliable signals of a frequency band for position detection. It is apparent that, the first frequency mixing device, as a nonlinear element, has lower requirements in arrangement and cost, which is beneficial to realize the position detection of the antenna in the customer terminal device with reduced spatial arrangement complexity and cost.

As shown in FIG. 9, S300 includes but is not limited to S310 in the case that the second transmission component includes but is not limited to a second frequency mixing device.

At S310, the second frequency mixing device is caused to acquire the first detection signal and a second reference signal, and to mix the first detection signal with the second reference signal to obtain and output the third detection signal.

In an embodiment, the positioning device in the related technical scheme is replaced by the second frequency mixing device. Since the second reference signal can be preset, the high accuracy of the obtained third detection signal is ensured. That is, the second frequency mixing device can also output stable and reliable signals of a frequency band for position detection. It is apparent that, the second frequency mixing device, as a nonlinear element, has a lower requirement in arrangement and cost, which is beneficial to realize the position detection of the antenna in the customer terminal device with reduced spatial arrangement complexity and cost.

As shown in FIG. 10, the method for position detection further includes but is not limited to S600.

At S600, the result of the position detection of the antenna module sent by the UWB positioning module is acquired and reported.

In an embodiment, the UWB positioning module is caused to detect the position of the antenna module, that is, the UWB positioning module can determine the result of the position detection of the antenna module. And thus, the result of the position detection can be acquired and reported. So that the equipment, devices or users at the subsequent stage can perform analysis based on the result of the position detection in which a determination is performed as to whether the position of the antenna module will affect the signal transmission between the customer terminal device and the cell of a base station, so as to further determine whether the adjustment in position of the antenna module is necessary to ensure the stable transmission of signals between customer terminal devices and the cell of the base station.

Figure 11:
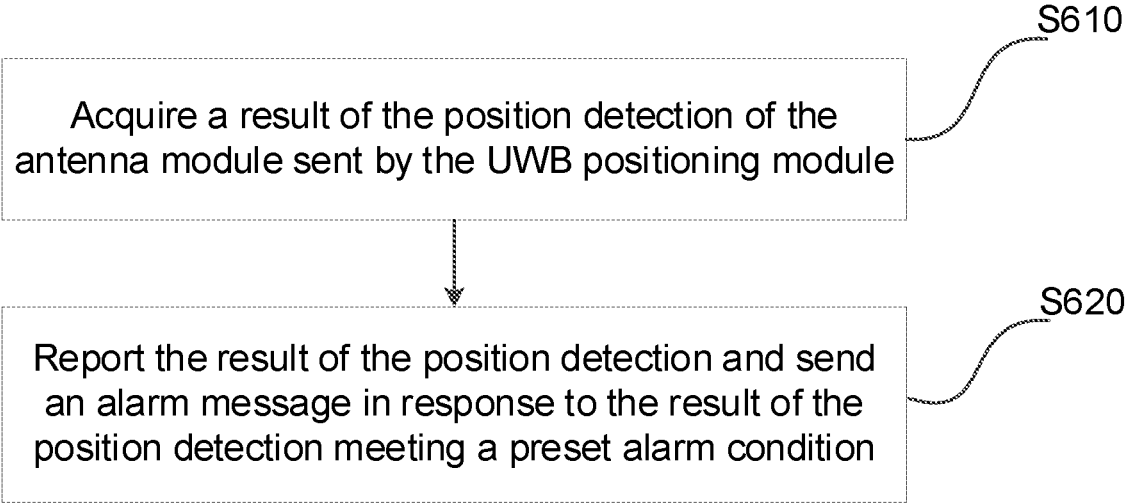
FIG. 11 depicts a flowchart showing the report of a result of position detection in a method for position detection according to an embodiment of the present disclosure.

As shown in FIG. 11, S600 includes but is not limited to S610 to S620.

At S610, a result of the position detection of the antenna module sent by the UWB positioning module is acquired.

At S620, the result of the position detection is reported and an alarm message is sent in response to the result of the position detection meeting a preset alarm condition.

In an embodiment, when the result of the position detection of the antenna module sent by the UWB positioning module is acquired, the result will be subjected to an analysis before alarm, in which the difference between the result of the position detection and the preset alarm condition is determined. In response to the result of the position detection meeting a preset alarm condition, the result of the position detection is reported and an alarm message is sent at the same time, thus intuitively and reliably alarming that the current position of the antenna module can affect the signal transmission between the customer terminal device and the cell of the base station.

It can be understood that the method for position detection in any one of the above embodiments can be applied to the customer terminal devices in any one of the embodiments shown in FIG. 1 to FIG. 3, or FIG. 5, those embodiments all belong to the same concept of invention, so these embodiments have the same implementation principle and technical effect, and which are not described in detail here to avoid redundancy.

Figure 12:
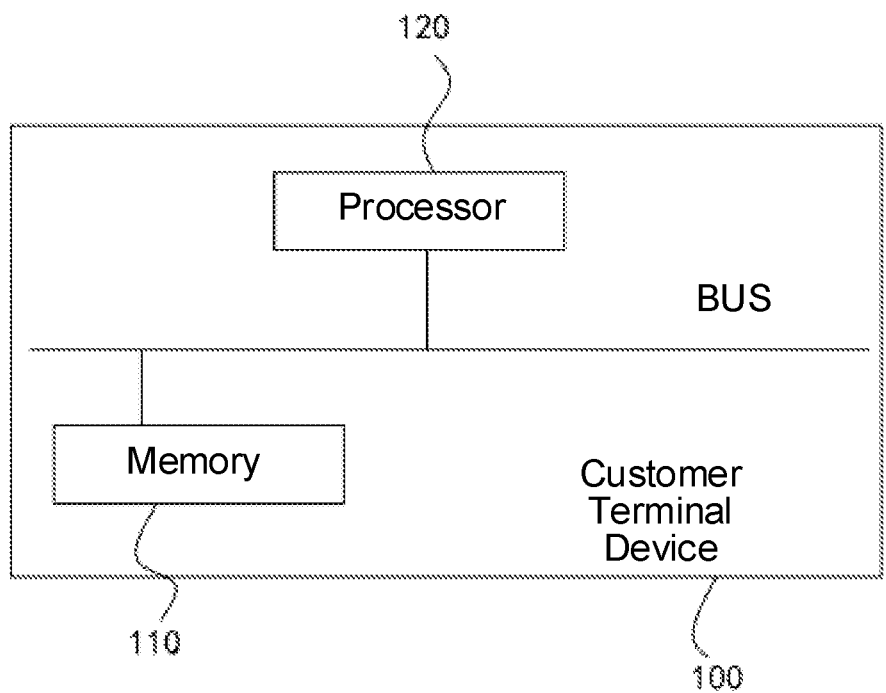
FIG. 12 depicts a schematic diagram showing a customer terminal device according to another embodiment of the present disclosure.

Referring to FIG. 12, an embodiment of the present disclosure further provides a customer terminal device 100, which includes a memory 110, a processor 120 and a computer program stored in the memory 110 and executable by the processor 120.

The processor 120 and the memory 110 may be connected by a bus or other means.

Since the customer terminal device 100 in this embodiment belongs to the same concept of invention as the customer terminal device in any one of the above-described embodiments, the implementation of the customer terminal device 100 in this embodiment can refer to any one of the above-described embodiments, and in order to avoid redundancy, the implementation of the customer terminal device 100 in this embodiment is not repeated here.

Non-transitory software programs and instructions for the method for position detection of any one of the above embodiments are stored in a memory 110 which, when executed by a processor 120, causes the processor 120 to carry out the method for position detection of any one of the above embodiments, for example, the operations S100 to S500 described in conjunction with FIGS. 6, S510 to S540 described in conjunction with FIG. 7, S210 described in conjunction with FIG. 8, S310 described in conjunction with FIG. 9, S600 described in conjunction with FIG. 10, or S610 to S620 described in conjunction with FIG. 11.

The above-described device embodiments are only illustrative, in which the units illustrated as separate components may or may not be physically separated, that is, they may be located in one place or distributed over several network units. Some or all of the modules can be selected according to the practical needs to achieve the purpose of this embodiment.

An embodiment of the present disclosure further provides a computer-readable storage medium, which stores computer-executable instructions which, when executed by a processor 120 or controller, for example, by a processor 120 in the embodiment of the customer terminal device 100, causes the processor 120 to carry out the method for position detection of any one of the above embodiments, for example, the operations S100 to S500 described in conjunction with FIGS. 6, S510 to S540 described in conjunction with FIG. 7, S210 described in conjunction with FIG. 8, S310 described in conjunction with FIG. 9, S600 described in conjunction with FIG. 10, or S610 to S620 described in conjunction with FIG. 11.

Included in an embodiment of the present disclosure is, a UWB positioning module, which is configured to output a first detection signal; a first transmission component, which is configured to receive a first detection signal and output a second detection signal according to the first detection signal; a second transmission component, which is configured to receive the first detection signal and output a third detection signal according to the first detection signal, where the positions of the UWB positioning module, the first transmission component and the second transmission component are different; an antenna module provided with a UWB positioning beacon that is configured to receive the first detection signal, the second detection signal and the third detection signal and send the first detection signal, the second detection signal and the third detection signal to the UWB positioning module. The UWB positioning module is further configured to receive the first detection signal, the second detection signal and the third detection signal sent by the UWB positioning beacon, and perform position detection on the antenna module according to the first detection signal, the second detection signal, the third detection signal, the position information of the UWB positioning module, the position information of the first transmission component and the position information of the second transmission component. According to the scheme set forth in various embodiments of the present disclosure, given that the UWB positioning module, the first and second transmission components are in positioned different positions, the UWB positioning module is enabled to detect the position of the antenna module according to the first detection signal, the second detection signal, the third detection signal, the position information of the UWB positioning module, the position information of the first transmission component and the position information of the second transmission component. Since the position detection of the antenna module can be realized by means of one UWB positioning module and two transmission components for signal transfer, there is no need to simultaneously set up multiple positioning devices to detect the position of the antenna module. Thereby, the position detection of the antenna module can be carried out with reduced complexity in spatial arrangement and costs.

It shall be appreciated by a person having ordinary skills in the art that all or some of the steps in the method and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

Described above is a description of some embodiments of the present disclosure, but the present disclosure is not limited to the above embodiments. Those having ordinary skills in the art can make various equivalent modifications or substitutions without departing the scope of the present disclosure, and these equivalent modifications or substitutions are within the scope defined by the claims of the present disclosure.

What is claimed is:

1. A customer terminal device, comprising,
an ultra-wideband (UWB) positioning module, which is configured to output a first detection signal;
a first transmission component, which is configured to receive the first detection signal and output a second detection signal according to the first detection signal;
a second transmission component, which is configured to receive the first detection signal and output a third detection signal according to the first detection signal; wherein,
the UWB positioning module, the first transmission component and the second transmission component are positioned at different positions within the customer terminal device;
an antenna module, which is arranged within the customer terminal device, and is provided with a UWB positioning beacon that is configured to receive the first detection signal, the second detection signal and the third detection signal, and to send the first detection signal, the second detection signal and the third detection signal to the UWB positioning module; and wherein,
the UWB positioning module is further configured to receive the first detection signal, the second detection signal and the third detection signal sent by the UWB positioning beacon, and to perform position detection on the antenna module to detect a position of the antenna module within the customer terminal device, according to the first detection signal, the second detection signal, the third detection signal, position information of the UWB positioning module, position information of the first transmission component, and position information of the second transmission component.

2. The customer terminal device according to claim 1, wherein the UWB positioning module is configured to:
acquire a first distance from the UWB positioning beacon to the UWB positioning module, according to a moment at which the UWB positioning module outputs the first detection signal and a moment at which the UWB positioning module receives the first detection signal sent by the UWB positioning beacon;
acquire a second distance from the UWB positioning beacon to the first transmission component according to the moment at which the UWB positioning module outputs the first detection signal, a moment at which the first transmission component receives the first detection signal and a moment at which the UWB positioning module receives the second detection signal sent by the UWB positioning beacon;
acquire a third distance from the UWB positioning beacon to the second transmission component according to the moment at which the UWB positioning module outputs the first detection signal, a moment at which the second transmission component receives the first detection signal and a moment at which UWB positioning module receives the third detection signal sent by the UWB positioning beacon; and

acquire the position information of the antenna module, according to the position information of the UWB positioning module, the position information of the first transmission component, the position information of the second transmission component, the first distance, the second distance and the third distance.

3. The customer terminal device according to claim 1, wherein the first transmission component comprises a first frequency mixing device that is configured to:
acquire the first detection signal and a first reference signal; and
mix the first detection signal with the first reference signal to obtain and output the second detection signal.

4. The customer terminal device according to claim 1, wherein the second transmission component comprises a second frequency mixing device that is configured to:
acquire the first detection signal and a second reference signal; and
mix the first detection signal with the second reference signal to obtain and output the third detection signal.

5. The customer terminal device according to claim 1, further comprising:
a main control module that is configured to obtain and report a result of the position detection of the antenna module sent by the UWB positioning module.

6. The customer terminal device according to claim 5, wherein the main control module is configured to:
acquire the result of the position detection of the antenna module sent by the UWB positioning module; and
report the result of the position detection, and send an alarm message in response to the result of the position detection meeting a preset alarm condition.

7. A method for position detection of an antenna module within a customer terminal device, wherein, the customer terminal device comprises an ultra-wideband (UWB) positioning module, a first transmission component, a second transmission component, and the antenna module provided with a UWB positioning beacon, wherein the UWB positioning module, the first transmission component and the second transmission component are positioned in different positions;
and wherein, the method comprises,
causing the UWB positioning module to output a first detection signal;
causing the first transmission component to receive the first detection signal and output a second detection signal according to the first detection signal;
causing the second transmission component to receive the first detection signal and output a third detection signal according to the first detection signal;
causing the UWB positioning beacon to receive the first detection signal, the second detection signal and the third detection signal, and to send the first detection signal, the second detection signal and the third detection signal to the UWB positioning module; and
causing the UWB positioning module to receive the first detection signal, the second detection signal and the third detection signal sent by the UWB positioning beacon, and to perform position detection on the antenna module to detect a position of the antenna module within the customer terminal device, according to the first detection signal, the second detection signal, the third detection signal, position information of the UWB positioning module, position information of the first transmission component and position information of the second transmission component.

8. The method according to claim 7, wherein causing the UWB positioning module to perform position detection on the antenna module according to the first detection signal, the second detection signal, the third detection signal, the position information of the UWB positioning module, the position information of the first transmission component and the position information of the second transmission component comprises, causing the UWB positioning module to acquire a first distance from the UWB positioning beacon to the UWB positioning module, according to a moment at which the UWB positioning module outputs the first detection signal and a moment at which the UWB positioning module receives the first detection signal sent by the UWB positioning beacon;

causing the UWB positioning module to acquire a second distance from the UWB positioning beacon to the first transmission component according to the moment at which the UWB positioning module outputs the first detection signal, a moment at which the first transmission component receives the first detection signal and a moment at which the UWB positioning module receives the second detection signal sent by the UWB positioning beacon;

causing the UWB positioning module to acquire a third distance from the UWB positioning beacon to the second transmission component according to the moment at which the UWB positioning module outputs the first detection signal, a moment at which the second transmission component receives the first detection signal and a moment at which UWB positioning module receives the third detection signal sent by the UWB positioning beacon; and causing the UWB positioning module to acquire position information of the antenna module, according to the position information of the UWB positioning module, the position information of the first transmission component, the position information of the second transmission component, the first distance, the second distance and the third distance.

9. The method according to claim 7, wherein the first transmission component comprises a first frequency mixing device, and causing the first transmission component to receive the first detection signal and output the second detection signal according to the first detection signal comprises, causing the first frequency mixing device to acquire the first detection signal and a first reference signal, and to mix the first detection signal with the first reference signal to obtain and output the second detection signal.

10. The method according to claim 7, wherein the second transmission component comprises a second frequency mixing device, and causing the second transmission component to receive the first detection signal and output the third detection signal according to the first detection signal comprises, causing the second frequency mixing device to acquire the first detection signal and a second reference signal, and to mix the first detection signal with the second reference signal to obtain and output the third detection signal.

11. The method according to claim 7, further comprising, acquiring and reporting a result of the position detection of the antenna module sent by the UWB positioning module.

12. The method according to claim 11, wherein acquiring and reporting the result of the position detection of the antenna module sent by the UWB positioning module comprises, acquiring the result of the position detection of the antenna module sent by the UWB positioning module; and reporting the result of the position detection, and sending an alarm message in response to the result of the position detection meeting a preset alarm condition.

13. A customer terminal device, comprising a memory, a processor and a computer program stored in the memory and executable by the processor which, when executed by the processor causes the processor to carry out the method of claim 7.

14. A non-transitory computer-readable storage medium storing a computer-executable instruction which, when executed by a processor, causes the processor to carry out the method of claim 7.

* * * * *